May 23, 1950     M. W. OFFINGER ET AL     2,508,465
LINED METAL TUBE AND METHOD OF MANUFACTURE
Filed March 18, 1944
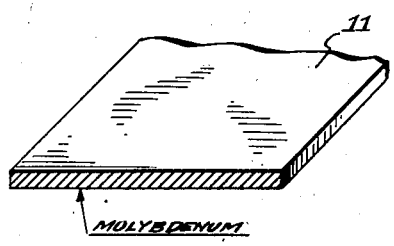
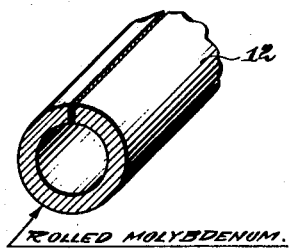
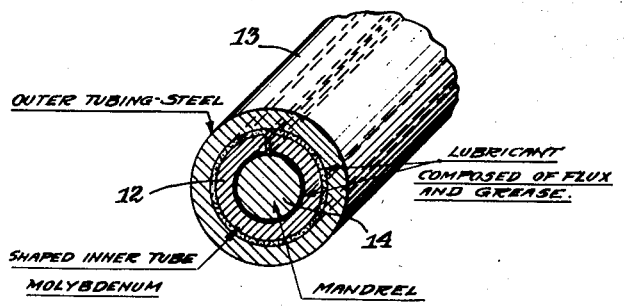
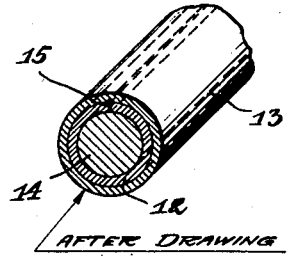
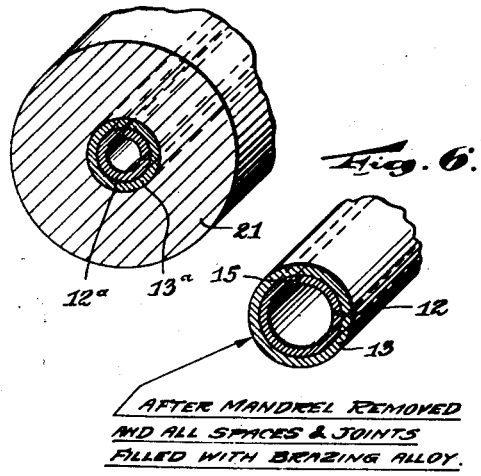
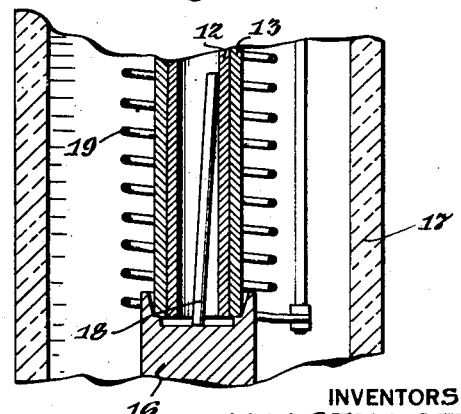
INVENTORS
M. W. OFFINGER
T. H. GRAY
BY
ATTORNEY Patented May 23, 1950

2,508,465

UNITED STATES PATENT OFFICE 2,508,465

LINED METAL TUBE AND METHOD OF MANUFACTURE

Martin W. Offinger, Montclair, N. J., and Theodore H. Gray, Wilkinsburg, Pa., assignors to Westinghouse Electric Corporation, East Pittsburgh, Pa., a corporation of Pennsylvania Application March 18, 1944, Serial No. 527,028

12 Claims. (Cl. 138—62)

This invention relates to the manufacture of composite tubes, and more particularly, to steel tubing lined with molybdenum.

The principal object of our invention, generally considered, is to manufacture tubing or cylindrical parts of non-refractory metal, such as steel, as for toughness, lined with refractory metal, such as molybdenum, as for protection against chemical attack.

Another object of our invention is to make molybdenum-lined steel tubing or cylinders by bending plate molybdenum, as by rolling into a one-seam tube, placing said molybdenum tube within a preferably seamless steel tube, fitting said combination over a mandrel which has been well covered with grease and flux, drawing the combination on said mandrel to the desired size, removing the mandrel, and brazing the parts of the combination together.

A further object of our invention is the manufacture of relatively thick steel cylinders lined with molybdenum in which the combination of a steel tube with a one-seam molybdenum lining therein is, after drawing to size, inserted in a relatively thick-walled steel cylinder or carrier, and all three parts simultaneously brazed together, preferably using a copper-nickel-silicon alloy.

Still further objects of our invention are the products of the methods above described.

Other objects and advantages of the invention, relating to the particular arrangement and construction of the various parts, will become apparent as the description proceeds.

Referring to the drawings:

Fig. 1 is a perspective view of a plate or sheet of refractory metal, such as molybdenum;

Fig. 2 is a perspective view of a one-seam tube of such metal, formed from said plate or sheet in any desired manner, as by rolling;

Fig. 3 is a perspective view of the tube of molybdenum, as illustrated in Fig. 2, assembled with a steel tube, a mandrel, and a lubricant such as flux-carrying grease, preparatory to being drawn to size;

Fig. 4 is a view corresponding to Fig. 3, but showing the combination steel and molybdenum tube after being drawn to size on the mandrel;

Fig. 5 is a view of the combination illustrated in Fig. 4, after removal of the mandrel and placing in a brazing furnace with the desired amount of brazing alloy;

Fig. 6 is a view of the composite tube after brazing and removal from the furnace; and Fig. 7 corresponds to Fig. 6, but shows such a composite tube combined with a steel carrier or a hollow cylinder with relatively thick walls.

Referring to the drawings in detail, and first considering the embodiment of our invention illustrated in Figures 1 to 6, inclusive, there is shown a plate or sheet 11 of refractory metal, such as molybdenum or tungsten, which, in Fig. 1, is flat and in Fig. 2 has been formed, preferably by rolling into a one-seam tube 12. This may be effected by passing the sheet 11 successively between rollers having peripheral grooves which hold the edges of said sheet. Successive rollers are more closely spaced, as in conventional practice, so that the plate is bent gradually until it finally assumes the form illustrated in Fig. 2.

The refractory metal or molybdenum cylinder of Fig. 2 is then inserted into an outer tube 13, of steel or other desired non-refractory metal, peripherally-continuous or of unbroken circumferential continuity, as illustrated in Fig. 3, and a mandrel 14 well lubricated, preferably by means of a flux-carrying grease, such as a mixture of palm oil with "Handy" flux, such as manufactured by Handy & Harman Co., Bridgeport, Conn., is then inserted. The combination is then passed through a die until the outer tube 13 is drawn tightly over the inner tube 12, and the seam 15 of the latter reduced to negligible width as illustrated in Fig. 4. The mandrel is preferably not reduced in diameter, so that it may then be withdrawn because of the initial lubrication and re-used. This result may be readily accomplished by making the mandrel of harder steel or metal than that of the tube 13.

Ordinarily the assembly would be finished at this point, but in accordance with our invention we propose to fill all spaces and joints with brazing alloy as by means of capillary action.

Owing to the use of lubricant on the mandrel, some parts of the inner joint usually have remnants of grease attached and imprisoned within the seams. This grease will carbonize upon heating and, instead of a completely brazed assembly, we are almost certain to have a defective tube due to the action of the entrapped carbon. It is for this reason that we use the flux-containing lubricant referred to, or other containing a flux, such as sodium fluoride, (say about 25% to 50% of the grease by weight), which carries out all the carbon in the joint and which is itself pushed out by the molten brazing alloy. The brazing alloy that we find preferable is one containing 93% copper, 6% nickel and 1% silicon. It forges and rolls easily and has a melting point of about 1,080° C. This alloy has high strength at elevated temperatures, as is desired.

In completing the manufacture of the composite tube, in accordance with our invention, we take it after removal of the mandrel 14 and stand it vertically in a supporting iron tray 16 in the muffle of an induction furnace 17, the interior of which contains a protective atmosphere of reducing gas, such as dissociated ammonia or other gas with hydrogen as its active ingredient. The brazing alloy is placed within the bore of the tube 12—13 in the form of a rod 18. The tube 12—13 is heated by induction, as by means of coil 19, so that the alloy is the last portion of the assembly to reach brazing temperature, thus insuring rapid flow into all portions of the joints when the alloy melts.

As the alloy melts, it accumulates in the supporting tray 16 and then flows up into all of the joints between the tubes 12 and 13 by capillary action, when it reaches the desired brazing temperature of about 1100° C. After this has occurred, the heating coil 19 is lowered slowly to allow the alloy in the joints to solidify from the top down in order that the shrinkage of the solidifying alloy will be replaced from tray 16 of molten metal. After the heating coil has been lowered to the point where all of the alloy has solidified, the assembly is allowed to cool and is then removed.

The heating of the assembly requires a definite procedure to remove the adsorbed gases and moisture before the brazing occurs. This procedure previously consisted in heating the assembly slowly to a temperature of about 1000° C. and holding it at this temperature for about ½ hour before elevating it to the brazing temperature of about 1100° C. The height to which capillary action will fill the joints with brazing alloy is dependent on the spacing of the parts and the purity of the protective atmosphere, which is desirably prepared with a dew point below −40° C. The height ranges from 10 inches to a theoretical maximum of 35 inches, with a spacing of the parts of .001 inch.

Fig. 6 shows approximately to scale and in perspective, a desirably seamless steel tube with a one seam molybdenum lining brazed in place, as in a furnace such as illustrated in Fig. 5.

Referring now to the embodiment of our invention illustrated in Fig. 7 there is shown approximately to scale and in perspective, a composite tube 12ª—13ª, such as illustrated in Fig. 6, brazed inside of a steel cylinder carrier 21, which may have a relatively thick wall, as illustrated. Such a composite construction is desirably produced like the structure illustrated in Fig. 6, except that after drawing the steel tube 13ª over the molybdenum lining 12ª, as illustrated in Fig. 4, and removing the mandrel 14, the combination before brazing is tightly inserted in the bore of a tube, such as designated by the reference character 21. Before inserting, both parts are thoroughly cleaned with carbon tetrachloride. The three-part assembly is then placed vertically within the muffle of a furnace 17, as illustrated in Fig. 5, and otherwise treated exactly like two-part assembly 12—13 illustrated in said furnace, in order to make the product illustrated in Fig. 7.

Where especially tight fits between the assembled tubes are desired, such composite metal tubes are desirably slightly tapered to fit the correspondingly tapered bore of the steel or non-refractory carrier tube. The assembly is then desirably brazed with axial pressure applied to the composite inner tube to maintain intimate contact between all parts during the brazing operation.

Although preferred embodiments of our invention have been disclosed, it will be understood that modifications may be made within the spirit and scope of the appended claims.

We claim:

1. The method of making a metal tube lined with refractory metal comprising bending a sheet of said refractory metal into hollow cylindrical form, fitting said bent sheet tightly into a peripherally-continuous metal tube, inserting a well-greased and flux-covered mandrel inside of said bent sheet to preserve the shape of the bore, drawing said tube and bent sheet to size on said mandrel, removing said mandrel, and brazing said bent sheet to said tube.

2. The method of making a molybdenum-lined steel tube comprising bending a sheet of molybdenum into hollow cylindrical form, fitting said molybdenum part tightly into a peripherally-continuous steel tube, applying grease and flux to a mandrel, drawing said steel tube and the molybdenum lining to size on said mandrel, removing said mandrel, placing the assembly of said tube with its contained bent sheet so that its lower end rests in a tray, placing enough brazing material in said tray to fill the space between said tube and sheet, and heating said assembly to a temperature high enough to cause the brazing material to melt, wet the lower end of said assembly, and flow into the space between the parts thereof by capillary action, thereby brazing said molybdenum to said tube.

3. The method of making a metal tube lined with refractory metal comprising bending a sheet of said refractory metal into hollow cylindrical form, fitting said bent sheet tightly into a peripherally-continuous metal tube, inserting a well-greased and flux-covered mandrel inside of said bent sheet to preserve the shape of the bore, drawing said tube and bent sheet to size on said mandrel, removing said mandrel, inserting said tube and bent sheet inside of a hollow cylindrical carrier, and brazing said parts together.

4. The method of making a molybdenum-lined steel tube comprising bending a sheet of molybdenum into hollow cylindrical form, fitting said molybdenum part tightly into a peripherally-continuous steel tube, applying grease and flux to a mandrel, drawing said steel tube and the molybdenum lining to size on said mandrel, removing said mandrel, inserting said molybdenum-lined tube in a hollow cylindrical carrier, placing the assembly of said tube with its contained bent sheet so that its lower end rests in a tray, placing enough brazing material in said tray to fill the space between said tube and sheet, and heating said assembly to a temperature high enough to cause the brazing material to melt, wet the lower end of said assembly, and flow into the space between the parts thereof by capillary action, thereby brazing said parts together.

5. The method of making a non-refractory metal tube lined with refractory metal comprising bending a sheet of said refractory metal into hollow cylindrical form, fitting said bent sheet tightly into a tube of said non-refractory metal, inserting a well-greased, flux-covered mandrel inside of said bent sheet to preserve the shape of the bore, drawing said tube and bent sheet to size on said mandrel, removing said mandrel, placing said bent sheet and tube vertically within the muffle of an induction furnace containing a protective atmosphere, with the lower end resting in a tray, placing enough brazing alloy in said tray, heating said assembly to a temperature high enough to cause the alloy to melt in said tray, wet the lower end of said assembly, and then flow up into all of the joints by capillary action, gradually lowering the heating means to cause the alloy in the joints to solidify from the top down, in order that the shrinking of the solidifying alloy will be replaced from the molten alloy in the tray, and removing said assembly from the furnace after the alloy has solidified and the parts cooled.

6. The method of making a molybdenum-lined steel tube comprising bending a sheet of molybdenum into hollow cylindrical form, fitting said bent sheet tightly into a steel tube, applying grease and flux to a mandrel, drawing said tube and bent sheet to size on said mandrel, removing said mandrel, placing said bent sheet and tube vertically within the muffle of an induction furnace containing a protective atmosphere, with the lower end resting in a tray, placing a rod of copper-nickel-silicon brazing alloy, large enough for the purpose, within the bore of said sheet and with its lower end in said tray, heating said assembly to a temperature high enough to cause the alloy to melt, run down into said tray, wet the lower end of said assembly, and then flow up into all of the joints by capillary action, gradually lowering the heating means to cause the alloy in the joints to solidify from the top down in order that the shrinking of the solidifying alloy will be replaced from the molten alloy in the tray, and removing said assembly from the furnace after the alloy has solidified and the parts cooled.

7. The method of making a non-refractory metal tube lined with refractory metal comprising bending a sheet of said refractory metal into hollow cylindrical form, fitting said bent sheet tightly into a tube of said non-refractory metal, inserting a well-greased, flux-covered mandrel inside of said bent sheet to preserve the shape of the bore, drawing said tube and bent sheet to size on said mandrel, inserting said tube and bent sheet inside of a hollow cylindrical carrier, placing said bent sheet, tube and carrier vertically within the muffle of an induction furnace containing a protective atmosphere, with the lower end resting in a tray for the purpose, placing enough brazing alloy in said tray, heating the assembly to a temperature high enough to cause the alloy to melt in said tray, wet the lower end of said assembly, and then flow up into all of the joints by capillary action, gradually lowering the heating means to cause the alloy in the joints to solidify from the top down, in order that the shrinking of the solidifying alloy will be replaced from the molten alloy in the tray, and removing said assembly from the furnace after the alloy has solidified and the parts cooled.

8. The method of making a molybdenum-lined steel tube comprising bending a sheet of molybdenum into hollow cylindrical form, fitting said molybdenum part tightly into a steel tube, applying grease and flux to a mandrel, drawing said steel tube and molybdenum lining to size on said mandrel, removing said mandrel, inserting said molybdenum-lined tube into a hollow cylindrical carrier, placing said molybdenum-lined tube and carrier vertically within the muffle of an induction furnace containing a protective atmosphere, with the lower end resting in a tray, placing a rod of copper-nickel-silicon brazing alloy, large enough for the purpose, within the bore of the tube and with its lower end in said tray, heating said assembly to a temperature high enough to cause the alloy to melt, run down into said tray, wet the lower end of said assembly, and then flow up into all of the joints by capillary action, gradually lowering the heating means to cause the alloy in the joints to solidify from the top down, in order that the shrinking of the solidifying alloy will be replaced by the molten alloy in the tray, and removing said assembly from the furnace after the alloy has solidified and the parts cooled.

9. The method of lining a steel tube with molybdenum comprising bending a sheet of molybdenum into hollow cylindrical form, fitting said bent sheet tightly into a peripherally continuous steel tube, applying grease and flux to a mandrel, drawing said steel tube and molybdenum part to size on said mandrel, removing said mandrel, and brazing said molybdenum lining to said tube.

10. The method of making a molybdenum lined steel tube comprising bending a sheet of molybdenum into hollow cylindrical form, fitting said bent sheet tightly into a peripherally continuous steel tube, applying grease and flux to a mandrel, drawing said steel tube and molybdenum lining to size on said mandrel, removing said mandrel, inserting said molybdenum lined tube in a hollow cylindrical carrier, and brazing all of said parts together.

11. A composite tube comprising an outer seamless steel tube, a plate of molybdenum bent into a one-seam tube closely fitting inside of said seamless tube as a lining, and a copper-nickel-silicon brazing alloy disposed between and uniting the edges of said lining tube along its seam and the inner surface of said seamless tube to the outer surface of said molybdenum lining tube.

12. A composite tube comprising an outer seamless non-refractory metal tube, a plate of refractory metal selected from the group consisting of molybdenum and tungsten bent into a one-seam tube closely fitting inside of said seamless tubes as a lining, and a brazing alloy disposed between and uniting the edges of said lining tube along its seam and the inner surface of said seamless tube to the outer surface of said refractory metal lining tube.

MARTIN W. OFFINGER.
THEODORE H. GRAY.

REFERENCES CITED

The following references are of record in the file of this patent:

UNITED STATES PATENTS

| Number | Name | Date |
|---|---|---|
| 235,834 | White | Dec. 21, 1880 |
| 507,974 | Crosby | Oct. 31, 1893 |
| 563,932 | Leavenworth | July 14, 1896 |
| 1,431,368 | Bundy | Oct. 10, 1922 |
| 1,441,459 | Small | Jan. 9, 1923 |
| 1,465,755 | Bundy | Aug. 21, 1923 |
| 1,582,407 | King | Apr. 27, 1926 |
| 1,614,501 | Stoekle | Jan. 18, 1927 |
| 1,658,713 | Fuller | Feb. 7, 1928 |
| 1,700,454 | Schumacher | Jan. 29, 1929 |
| 1,702,234 | Goodridge | Feb. 12, 1929 |
| 1,757,790 | Armstrong | May 6, 1930 |
| 1,814,600 | Hopkins | July 14, 1931 |
| 1,839,964 | Harvey | Jan. 5, 1932 |
| 1,882,151 | Lagerblade | Oct. 11, 1932 |
| 1,892,607 | Bundy | Dec. 27, 1932 |
| 1,940,294 | Calkins | Dec. 19, 1933 |
| 1,946,121 | Wood | Feb. 6, 1934 |
| 1,963,745 | Ingersoll | June 19, 1934 |
| 2,014,983 | Quarnstrom | Sept. 17, 1935 |
| 2,060,034 | Chandler | Nov. 10, 1936 |
| 2,086,143 | Van Huffel | July 6, 1937 |
| 2,091,554 | Mendelhall | Aug. 31, 1937 |
| 2,241,644 | Nichols et al. | May 13, 1941 |
| 2,255,472 | Quarnstrom | Sept. 9, 1941 |
| 2,279,831 | Lempert et al. | Apr. 14, 1942 |
| 2,315,294 | Stewart | Mar. 30, 1943 |

FOREIGN PATENTS

| Number | Country | Date |
|---|---|---|
| 513,749 | Great Britain | Oct. 20, 1939 |